United States Patent [19]

Wurst

[11] Patent Number: 4,641,300
[45] Date of Patent: Feb. 3, 1987

[54] DIGITAL TIE LINE

[75] Inventor: Walter K. Wurst, Wellington, Canada

[73] Assignee: ITT Corporation, New York, N.Y.

[21] Appl. No.: 653,374

[22] Filed: Sep. 21, 1984

[51] Int. Cl.$^4$ ............................ H04J 1/16; H04J 3/02; H04L 27/10
[52] U.S. Cl. ........................................ 370/16; 370/85; 375/55
[58] Field of Search ................ 370/85, 88, 16; 375/55

[56] References Cited

U.S. PATENT DOCUMENTS

| | | | |
|---|---|---|---|
| 3,890,471 | 6/1975 | Hachenburg | 370/88 |
| 3,963,870 | 6/1976 | Couder et al. | 370/85 |
| 4,179,587 | 12/1979 | Herschtal | 370/58 |
| 4,340,960 | 7/1982 | Moran | 370/62 |
| 4,531,834 | 5/1982 | Ganz et al. | 370/88 |
| 4,536,877 | 8/1985 | Livingston et al. | 370/85 |
| 4,545,051 | 10/1985 | Belforte et al. | 370/85 |
| 4,554,656 | 11/1985 | Budrikis et al. | 370/85 |

FOREIGN PATENT DOCUMENTS

| | | |
|---|---|---|
| 1152401 | 5/1969 | United Kingdom . |
| 1391840 | 4/1975 | United Kingdom . |
| 1500274 | 2/1978 | United Kingdom . |
| 2085264 | 4/1982 | United Kingdom . |
| 2139855 | 5/1983 | United Kingdom . |

OTHER PUBLICATIONS

"Non–Military Uses for Manchester Terminal Units"; Communications International, Apr. 1978; Worland; pp. 12–16.

Primary Examiner—Douglas W. Olms
Assistant Examiner—Frank M. Scutch, III
Attorney, Agent, or Firm—John T. O'Halloran; Thomas F. Meagher

[57] ABSTRACT

The digital tie line provides a high speed pulse code modulation (PCM) digital path between private branch exchange (PBX) systems. The invention has a capability of providing a plurality of simultaneous two-way channels. By providing for twice the number of available channels in each PBX system, PBX systems may be interconnected by using one digital tie line per system, resulting in a non-blocking traffic situation between systems. High speed digital data may be directly passed via assigned channels between systems. The digital tie line provides a connection between the internal system parallel PCM bus and an externally located serial bus. A multiple PBX network can be interconnected by multiple external buses by employing a single digital tie line in each PBX system, per external bus. A modular time slot interchanger (MTSI) is used to direct signals between the system PCM bus and the external bus. The digital tie line may be employed for PCM voice and data processing, data switching, and other information communication applications. Connections to the external bus may be made via low cost coaxial cables. Manchester encoding of the serial external bus signal allows the external bus to retain timing and synchronization, and allows for shaping the power spectrum to permit relatively long cable lengths.

17 Claims, 5 Drawing Figures

DIGITAL TIE LINE

This invention relates to a digital tie line for digital communications systems.

Conventional tie lines are presently used to interconnect private branch exchange (PBX) systems. E & M trunk circuits are used in known systems to provide two analog voice frequency (VF) connections between systems per circuit. High speed digital data may not be directly passed via assigned channels between PBX systems because of the limited analog bandwidth of the E & M trunk circuits.

The invention is directed to a digital tie line which provides a high speed pulse code modulation (PCM) digital path between PBX systems. The invention has a capability of providing a plurality of simultaneous two-way channels. By providing for twice the number of available channels that exist in each PBX system, PBX systems may be interconnected by using one digital tie line per system, resulting in a non-blocking traffic situation between systems. High speed digital data may be directly passed via assigned channels between systems, which is not possible with E & M trunk circuits because of their limited analog bandwidth. The invention provides a connection between the internal system parallel time division multiplexed (TDM) PCM bus and an externally located serial bus. A multiple PBX network can be interconnected by multiple external buses by employing a single digital tie line in each PBX system, per external bus. A modular time slot interchanger (MTSI) is used to direct signals between the system PCM bus and the external bus. The digital tie line may be employed for PCM voice and data processing, data switching, and other information communication applications. Connections to the external bus may be made via low cost coaxial cables. Manchester encoding of the serial external bus signal allows the external bus to retain timing and synchronization, and allows for shaping the power spectrum to permit relatively long cable lengths.

The principles of the invention will be more fully appreciated from the illustrative embodiment in the drawings, in which.

Figure 1:
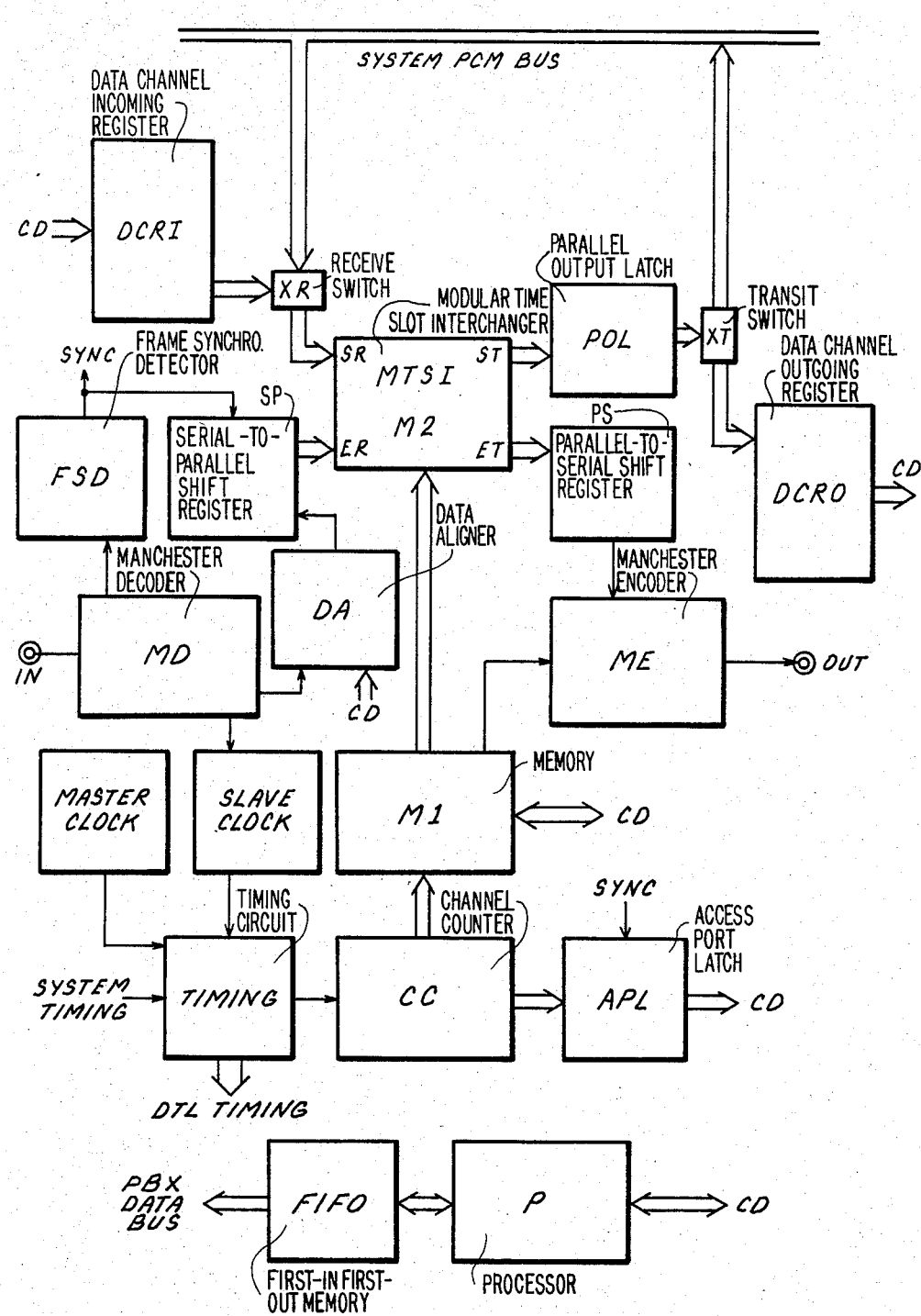
FIG. 1 shows a block diagram of a general embodiment of the present invention.

With reference to FIG. 1, the digital tie line employs a serialized PCM Manchester-encoded format. Digital tie lines of multiple PBXs may be connected to an external time division multiplexed PCM bus. A multiple PBX network can be interconnected by a single external bus by employing a single digital tie line in each PBX system. Alternatively, a multiple PBX network can be interconnected by multiple external buses by employing a single digital tie line in each PBX system, per external bus. Each digital tie line provides for an interface between its associated PBX system and its associated external bus.

By way of an example, the transmission rate of the parallel system time division multiplexed PCM bus is the T1 transmission rate of 1.544 megabits-per-second. The external PCM bus will be operated at 15.44 megabits-per-second, ten times the transmission rate of the parallel system TDM PCM bus. The external PCM bus will accommodate the 192 system PCM bus channels provided at the T1 transmission rate, each in a TDM channel time slot, and one synchronization time slot. Each channel will contain ten bits which consists of one synchronization or filler bit, eight PCM information bits, and one signalling bit. The frame synchronization signal is selected to be ten consecutive zeros inserted in external bus channel 193. Under error-free conditions, data strings in all other channels would not exceed nine consecutive zeros. The digital tie line employs the ten consecutive zero frame synchronization pattern, in one channel per frame, with the 10th bit in all other channels being a one, in order to make this pattern unique for simple frame synchronization.

The digital tie line is a processor-controlled circuit which contains a modular time slot interchanger for associating channels between the system and external buses and between the Manchester encoder and decoder circuitry, which are used in interfacing serialized PCM to the external bus. An on-board microprocessor may be coupled to the MTSI via a processor-controlled indexing memory for time slot logistics and control purposes. A combination of hardware and on-board software is employed to optimize the operation of the high speed, high-channel capacity MTSI, by efficiently performing complex functions not evident from the hardware configuration.

The MTSI is a 4-port memory network that associates TDM time slot assignments between its four ports. Two ports are assigned to input functions and two ports are assigned to output functions. The system PCM bus receive SR is employed to load the 193 system PCM bus time slot signals into the MTSI memory M2. The external bus receive port ER is employed to load the 193 incoming external bus time slot signals into M2. The system PCM bus transmit port ST is employed to route any time slot signals from the total of 386 time slot addresses in M2 to the system PCM bus. Finally, the external bus transmit port ET is employed to route any time slot signals from the 386 M2 time slot addresses to the outgoing external bus.

Unavailable system PCM bus time slot addresses may be assigned as a high speed bidirectional data channel to provide communication between the PBX system control processors which are connected to the digital tie lines. The basic data rate for the data channel may be, for example, 64 kilobaud.

The MTSI is operated in various switching modes under software control by digital tie line processor P. In the External Bus to System Bus switching mode, any time slot signal on the incoming external bus may be directed to any time slot on the system PCM bus. In the External Bus to External Bus Bypass switching mode, any time slot signal on the incoming external bus may be directed to any time slot on the outgoing external bus. In the System Bus to External Bus switching mode, any time slot signal on the system PCM bus may be directed to any time slot on the outgoing external bus.

The time slot assignments on the outgoing external bus may be variably delayed, in time slot period increments up to one time slot frame period, via software control. This delay facilitates master/slave operation when multiple external buses are used to interconnect PBX systems. The information on the incoming external bus may be delayed, via software control, up to one time slot frame period, in time slot period increments, so as to facilitate coincidence with the system PCM bus for frame alignment.

An unavailable system PCM bus time slot, for example, the 193rd time slot or a time slot which is assigned to reorder tones, may be assigned to a data channel register pair, comprised of an outgoing register DCRO and an incoming register DCRI, as a dedicated data channel for digital tie line intraprocessor communications, allowing for the transmission and reception of processor-originated data signals. Incoming and outgoing external bus time slots may be assigned to the dedicated data channels.

Four accesses are made to the MTSI memory M2 during one system PCM bus time slot period. During the first M2 access, M2 reads in and stores the incoming Manchester-encoded signal from the external bus after it has been decoded and converted from serial to 10-bit parallel form. In turn, all 193 incoming external bus time slots are stored, including the 10-bit frame sync pattern in channel 193.

During the second M2 access, M2 loads the contents of a memory address that is associated with a time slot via control memory M1 into a synchronous loading transmit parallel-to-serial shift register PS. Any combination of the 386 time slots stored in M2 may be transmitted in this manner. During the outgoing channel designated as channel 193, bit 14, for example, of the M1 output signal is programmed so as to cause the insertion of the framing pattern into this channel position. The framing pattern consists of ten consecutive zeros with bit 10 having an opposite polarity in channel positions 1 to 192. Channel assignment offsets applied to the contents of M1 may delay the outgoing serial frame up to 192 channel positions with respect to the local system PCM bus timing.

During the third M2 access, M2 reads the contents of either the system PCM bus or the incoming data channel register via receive switch XR, depending on the state of a control signal from control memory M1. The contents of all 192 channel time slots on the system PCM bus may be selected, or the incoming data channel register contents may be loaded in any of the 193 M2 locations that correspond to an unused PCM time slot location. For example, by programming bit 11 of the M1 output signal, the contents of the system PCM bus time slot are caused to be loaded into M2. By programming bit 11 of the M1 output signal to enter the opposite logic state, the 8-bit contents of the incoming data channel register, plus even parity bit, are loaded into M2. The digital tie line processor is sent an interrupt whenever the incoming data channel register is ready to be loaded with new data. The interrupt period may be, for example, the T1 framing period of 125 microseconds, which is derived from the 8 kilohertz voice-sampling period.

Finally, during the fourth M2 access, M2 loads the contents of a memory address, associated with a time slot via control memory M1, into a parallel output latch POL. The output of this latch is either placed in a transmit time slot on the system PCM bus or directed to the outgoing data channel register to be read by the digital tie line processor, via transmit switch XT. Bit 9, for example, of the M1 output signal may be employed to direct the latch output to the system PCM bus, while bit 10 may be employed to direct the latch output to the outgoing data channel register. The processor is sent an interrupt whenever the outgoing data channel register is loaded. The interrupt period may be the T1 framing period of 125 microseconds. Parity of the contents of the outgoing data channel register is checked and an error is detected and processed by the processor.

By way of example, the MTS1 memory M2 may be selected to be a 386-bit by 10-bit high-speed random access memory (RAM). Bit assignment may be as follows: bits 0 to 7 comprise the 8-bit system PCM bus information signal. Bit 8, the 9th bit, is employed for system PCM bus signalling. M2 may be duplicated for redundancy and to permit its testing without disrupting system operation.

The control memory M1 may, for example, be selected to be a 386 bit by 16 bit high-speed RAM. Time slot assignments are loaded into M1 by the digital tie line processor so as to control routing in the MTSI. The MTSI memory M2 is indexed with the contents of the M1 output signal to control time slot switching. This indexing operation is provided by the Channel Counter CC which is synchronized with digital tie line system timing signals.

The digital tie line processor may do read/write operations on M1 in an interleaved manner, transparent to the operation of the MTSI, by employing the processor Ready line. The 193 time slots on each of the system PCM bus and the external serial bus are selectively accessed by the digital tie line processor which employs internal software to compensate for offsets and propagation delays, as well as to control MTSI switching paths. The contents of M1 may be read for data verification purposes.

By way of example, the control memory M1 bit assignment may be as follows: bits 0 to 8 comprise the MTSI memory M2 index; bit 9 comprises a Transmit PCM time slot marker; bit 10 comprises a Receive Data Channel marker; bit 11 comprises a Transmit Data Channel marker; bit 12 comprises a Duplicate M2 RAM selector; bit 13 is not assigned and comprises a spare control bit; bit 14 comprises a Transmit Framing marker; and bit 15 comprises a Receive Framing marker. M1 may be duplicated for redundancy and to permit its testing without disrupting system operation.

The Channel Counter divides the 193 channel slots on the system PCM bus into 386 time slots, two per channel. This timing allows the information on both of the 193 channel system PCM and external serial buses to be merged in the MTSI for selective routing to system PCM bus or external bus destinations. The Channel Counter timing, for example, at the T1 digital transmission rate of 1.544 megahertz (MHz), may be derived from the timing circuit TIMING. This circuit generates timing signals, as well as control signals which are submultiples of the 1.544 MHz rate and which define timing states for the digital tie line circuitry. The Channel Counter is synchronized by the system framing pulse insuring accurate alignment with system PCM bus time slot assignments. A processor access port latch APL is connected to all counter stages, clocked by framing pulses from a frame synchronization detector FSD. This facilitates the calculation of data and frame alignment offsets, generating correction factors to be applied to the processor time slot assignment software.

The digital tie line may be operated to obtain timing from the PBX system PCM bus without the use of internal oscillators. A Master Clock, for example, 24.704 megahertz, is provided to take over timing from the PBX system PCM bus timing so as to control the timing of multiple interconnected systems to the required frequency stability and tolerance. This insures accurate frequency and phase synchronization with system PCM bus timing. Under some conditions, it is necessary to synchronize the Channel Counter with incoming external bus timing. Thus a phase-locked loop Slave Clock arrangement is provided for employment when the digital tie line is operated in a slave configuration to phase-lock onto the timing of the incoming serial signal. Selection of the timing source is made by the timing circuit.

Figure 2:
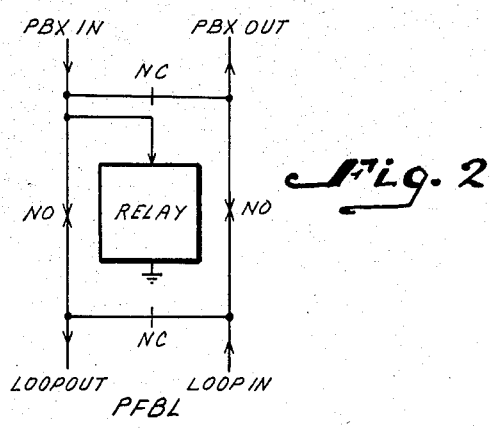
FIG. 2 shows a schematic diagram of the Power Fail Bypass and Loopback relay circuit.

The Manchester Encoder ME accepts the 10-bit parallel MTSI output which has been converted by the synchronous loading transmit parallel-to-serial shift register PS into, for example, a 15.44 megabit-per-second serial form. This signal is exclusive-ORed with a locally derived signal, for example, 15.44 megahertz, and sent via a line driver to the external bus transmission line, for example a coaxial cable. A direct current (DC) component is superimposed on the output signal in order to control a Power Fail Bypass and Loopback (PFBL) relay arrangement, shown in FIG. 2, which is located in an external bus transmission line coupling box. The Power Fail Bypass and Loopback relay arrangement, connected to the transmission line external to the system, may be employed to allow the signal to bypass the system for multiple interconnected systems.

Figure 3:
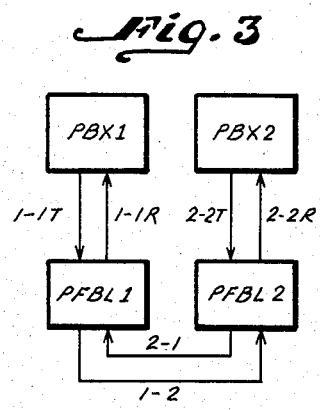
FIG. 3 shows a block diagram of the interconnection of two PBX systems in a single external bus configuration.

To illustrate the operation of the PFBL relay, FIG. 3 shows a block diagram of the interconnection of two PBX systems in a single external bus configuration. The interconnection of the two PBX systems PBX1 and PBX2 is made via the corresponding PFBL relay arrangements PFBL1 and PFBL2. In the presence of a DC component at the Manchester Encoder output of PBX1, the PFBL1 relay is operated, thus closing normally-open relay contacts No. and opening normally-closed relay contacts NC. In this operated condition, the PFBL allows the interconnection of its PBX system to the external bus loop. The PBX IN terminal, which is connected to the Manchester Encoder output of PBX1 via transmission line 1-1T, becomes connected to the LOOP OUT terminal, which is connected to tne LOOP IN terminal of the adjacent PFBL2 relay via transmission line 1-2. The PBX OUT terminal, which is connected to the Manchester Decoder input of PBX1 via transmission line 1-1R, becomes connected to the LOOP IN terminal, which is connected to the LOOP OUT terminal of the adjacent PFBL2 relay via transmission line 2-1.

In the absence of a DC component, the PFBL1 relay is not operated, thus opening the normally-open contacts NO and losing the normally-closed contacts NC. In this unpowered condition, the PFBL allows the bypass of the external bus loop. The PBX IN terminal becomes connected to the PBX OUT terminal and the LOOP IN terminal becomes connected to the LOOP OUT terminal.

The relay arrangement may provide for loopback by routing the serial signal via the MTSI from the serial input to the serial output. The 15.44 MHz clock is phase locked with a 1.544 MHz reference frequency for phase alignment with system PCM bus timing. Stability of the selected oscillators is advantageous because of their influence on the timing stability of multiple interconnected systems. Sections of the Manchester encoder may, for example, employ high-speed Schottky TTL logic.

The Manchester Decoder MD accepts the incoming external bus transmission line signal and converts it into, for example, a 15.44 megabit-per-second serial form, while at the same time extracting the 15.44 MHz timing information. The serial data is sent to the Data Aligner DA which consists of, for example, a processor-controlled 8 stage shift register and data selector circuit. The Data Aligner is employed to insert a programmable serial delay of up to 8 bits for controlling phase alignments between incoming external bus and system PCM bus channels.

The delayed signal is then shifted into a 10-stage serial-to-parallel conversion shift register SP. When 10 consecutive zeros are detected by the frame synchronization detector FSD during channel 193, once every frame, a synchronous decade counter of the FSD which is clocked at the bit rate is reset, phasing the counter with the serial channel bit periods. The synchronous decade counter then transfers the shift register contents to a 9-bit buffer latch which is connected to the external bus receive parallel port ER on the MTSI.

Data delay is calculated by noting the channel subdivision counter contents at the instant a frame synchronization pulse is detected on the incoming external bus signal. This value is used to determine a delay offset that makes the 9-bit buffer latch loading transitions invisible to the MTSI. This circuit, along with software calculated time slot assignment offsets, simplifies the hardware implementation of frame alignment.

The frame alignment offset is used to reduce susceptibility to external bus noise in the frame synchronization detector, by the use of optimized synchronization algorithms. Once the offset is calculated, a pulse is generated to gate the detector in the anticipated time slot, once per frame via M1, thus enhancing immunity to erroneous framing pulses that may occur during the received frame due to bit errors. The processor, via its software, examines several successive frame pulses to verify that they occur in the anticipated time slot before confirming framing. In a like manner, the consecutive absence of frame pulses determines a loss-of-frame condition. Software controlled LEDs may be employed to indicate tie line status. This method of frame synchronization greatly reduces hardware complexity allowing software algorithms to handle framing in a reliable and efficient manner.

A processor P, for example, an Intel 8085A microprocessor, may be used to control the digital tie line, making it appear as an intelligent peripheral device to the PBX. Advantages of microprocessors of this type are the availability of multiple interrupt lines, fast interrupt response, relatively efficient operation using table-based software, simple hardware interfacing, and low cost. For processor memory requirements, for example, CMOS RAM may be employed, as well as electrically programmable read-only memory (EPROM), for the table-based software.

The processor communicates with the PBX system via, for example, a first-in/first-out (FIFO) RAM with, for example, a 128 byte capacity. Communications are made with MTSI data time slots via the data channel registers, using interrupts to inform the processor of data-ready conditions. The communications may be sent to and received from the external bus using a packetized format.

A main function of the processor is to control the MTSI memory M2. Read/write operation is synchronized with MTSI operation using the processor Ready line to introduce wait states when required. The software calculates time slot assignment values from frame alignment and delay offsets. Channel offsets are used to calculate the delay coefficient for the Data Aligner. The processor controls MTSI channel assignments via high level commands from the PBX system, taking into account incoming serial signal frame misalignment and outgoing serial signal delays, as well as other factors.

The digital tie line operates in different modes, permitting the same digital tie line circuit to be used in master or slave configurations. The master will generate the external bus timing signals, while the slaves lock onto the timing generated by the master. The slave extracts the timing content of the incoming external bus signals and uses the extracted timing content for its timing reference, phase-locked to the Slave Clock. The master employs the Master Clock as its timing reference. More than one digital tie line may be used in each PBX system to expand external bus capacity in blocks of 192 2-way channels.

In the Master/Master mode, the digital tie line operates as a master in a single external bus configuration, or as a master on the first bus in a multiple external bus configuration. The digital tie line Master Clock provides, for example, 1.544 MHz timing to the local system PCM bus. Incoming timing is not used in this mode.

In the Slave/Master mode, the digital tie line operates as a slave in a single external bus configuration, or as a slave on the first bus of a multiple external bus configuration and as a master for all other external buses. The incoming external bus timing phase-locks the 12.352 MHz slave clock which then provides 1.544 MHz timing to the local system PCM bus.

In the Slave/Slave mode, the digital tie line operates as a slave for buses 2 to n in a multiple external bus configuration with n buses. The 1.544 MHz clock timing is taken from the local system PCM bus timing. Incoming external bus timing and the master and slave oscillators are not used in this mode.

Figure 4:
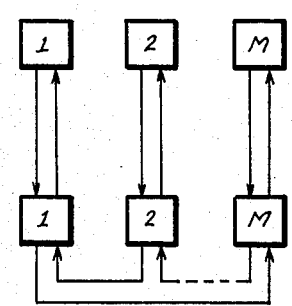
FIG. 4 shows a block diagram of the interconnection of three PBX systems in a single external bus configuration.
Figure 5:
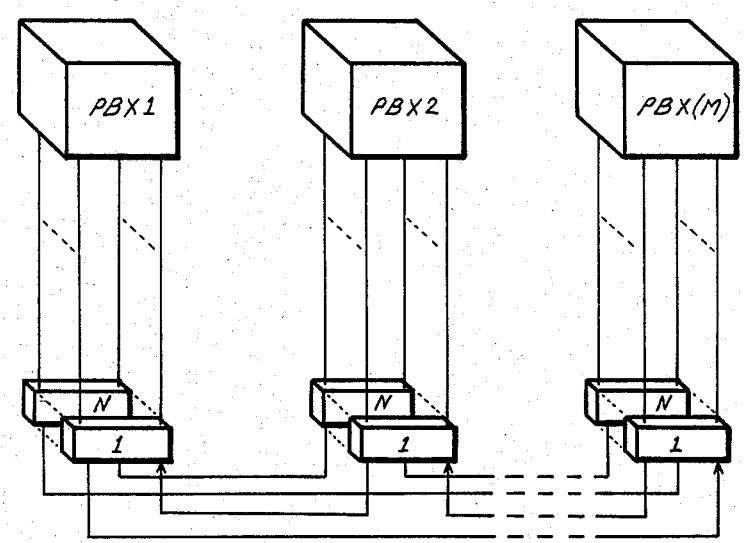
FIG. 5 shows a block diagram of the interconnection of PBX systems in a multiple external bus configuration.

As described previously, FIG. 3 shows a block diagram of the interconnection of two PBX systems in a single external bus configuration. FIGS. 3, 4, and 5 show the capability for system size expansion and for improved traffic handling. FIG. 4 shows a block diagram of the interconnection of three or more PBX systems in a single external bus configuration. Such a configuration would allow for an increase in line size. The LOOP OUT terminal of the PFBL of PBX1 is connected to the LOOP IN terminal of the PFBL of PBX(M) in an M PBX configuration, where M is an integer greater than three. The LOOP OUT terminal of the PFBL of PBX(M) is connected to the LOOP IN terminal of the PFBL of PBX(M−1). FIG. 5 shows a block diagram of the interconnection of three or more PBX systems in a multiple external bus configuration. Depicted is an N external bus configuration for an M PBX system, where N is an integer greater than one. Such a configuration allows for an improved grade of service. As examples, while a system with one external bus allows for 192 2-way channels, a two external bus system would allow for 384 channels, and a three external bus system would allow for 576 channels.

The invention allows for the use of low cost coaxial cables, for example, cable television coaxial cables to interconnect two or more PBX systems. Use of coaxial cable provides radiation shielding of the transmission lines. One cable is employed for the outgoing signal and the other is employed for the incoming signal, providing ease of interconnection. Manchester encoding of the serial external bus signal allows the external bus to retain timing and synchronization, and allows for shaping the power spectrum to permit cable lengths that are greater than 1000 feet.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

I claim:

1. A digital tie line for digital communication systems, comprising;
    means, coupled to a system bus and an external bus of said systems, for directing signals between each of said buses, comprising means for associating time slot assignments of said signals between said buses,
    means, connected to said directing means, for controlling said directing means,
    means for serializing system bus signals prior to directing said serialized system bus signals onto said external bus,
    means for Manchester encoding said serialized system bus signals for insertion onto said external bus,
    means for Manchester decoding external bus signals prior to directing said Manchester decoded external bus signals onto said system bus,
    means for parallelizing said Manchester decoded external bus signals for insertion onto said system bus, and
    means, coupled to said directing means, for providing a bypass of said external bus, in response to the absence of a dc component of said Manchester encoded serialized system bus signals provided from said Manchester encoded means, by providing a direct path around said digital tie line for external bus signals of one or more other digital tie lines coupled to said external bus.

2. A digital tie line according to claim 1, wherein said directing means comprises a mocular time slot interchanger.

3. A digital tie line according to claim 1, wherein said controlling means comprises:
    an indexing memory, and
    a processor, coupled to said indexing memory, for controlling said indexing memory.

4. A digital tie line according to claim 1, wherein said signals are pulse code modulated.

5. A digital tie line according to claim 1, wherein said modulator time slot interchanger comprises:
    a memory,
    a first input port, coupled to said system bus, for receiving signals contained in time slots from said system bus for loading into said memory,
    a second input port, coupled to said external bus, for receiving signals contained in time slots from said external bus for loading into said memory,
    a first output port, coupled to said system bus, for routing selected time slot signals from said memory to said system bus, and
    a second output port, coupled to said external bus, for routing selected time slot signals from said memory to said external bus.

6. A digital tie line according to claim 1, further comprising
means, coupled to said directing means and to said controlling means, for providing a data channel for communication between said systems.

7. A digital tie line according to claim 6, wherein an unavailable system bus time slot is assigned to said data channel.

8. A digital tie line according to claim 6, wherein said data channel providing means comprises
a first register means for transferring received data channel signals from said directing means to said controlling means, and
a second register means for transferring data channel signals to be transmitted from said controlling means to said directing means.

9. A digital tie line according to claim 8, further comprising
first switch means, coupled to said directing means, for selectively connecting said directing means to said system bus and to said first register means, and
second switch means, coupled to said directing means, for selectively connecting said second register means and said system bus to said directing means.

10. A digital tie line according to claim 1, wherein said directing means comprises
means for directing any time slot signal on said external bus to any time slot on said system bus.

11. A digital tie line according to claim 1, wherein said directing means comprises
means for directing any time slot signal on said system bus to any time slot on said external bus.

12. A digital tie line according to claim 1, wherein said directing means comprises
means for directing any time slot signal on said external bus to any time slot on said external bus.

13. A digital tie line according to claim 1, further comprising
means, coupled to said directing means, for providing time alignment of said external bus with said system bus.

14. A digital tie line according to claim 13, wherein said alignment means comprises
means for variably delaying external bus signals directed from said directing means.

15. A digital tie line according to claim 1, wherein said bypass means comprises a relay arrangement.

16. A communication system, comprising
a group of digital tie lines, each of said digital tie lines connected to an associated private branch exchange system, and
a group external bus, connected to each of said digital tie lines of said group, wherein each of said digital tie lines comprises
means, coupled to a system bus of said associated private branch exchange system and said group external bus, for directing signals between each of said buses,
means, connected to said directing means, for controlling said directing means, comprising means for associating time slot assignments of said signals between said buses,
means for serializing system bus signals prior to directing said serialized system bus signals onto said group external bus,
means for Manchester encoding said serialized system bus signals for insertion onto said group external bus,
means for Manchester decoding group external bus signals prior to directing said Manchester decoded group external bus signals onto said system bus,
neans for parallelizing said Manchester decoded group external bus signals for insertion onto said system bus,
at least one other group of digital tie lines, each of said digital tie lines of said other group connected to one of said associated private branch exchange systems, and
at least one other group external bus, each connected to each of said digital tie lines of said other group.

17. A communication system according to claim 16, wherein said group external bus is comprised of coaxial cable.

* * * * *